Dec. 12, 1961  F. G. HODGES, JR., ET AL  3,012,590
APPARATUS FOR PRODUCING SPRING UNITS
Filed Oct. 30, 1957  5 Sheets-Sheet 1

INVENTORS
Frederick G. Hodges Jr.
Clarence J. Smith
By: Olson & Trexler attys.

Dec. 12, 1961  F. G. HODGES, JR., ET AL  3,012,590
APPARATUS FOR PRODUCING SPRING UNITS
Filed Oct. 30, 1957  5 Sheets-Sheet 2
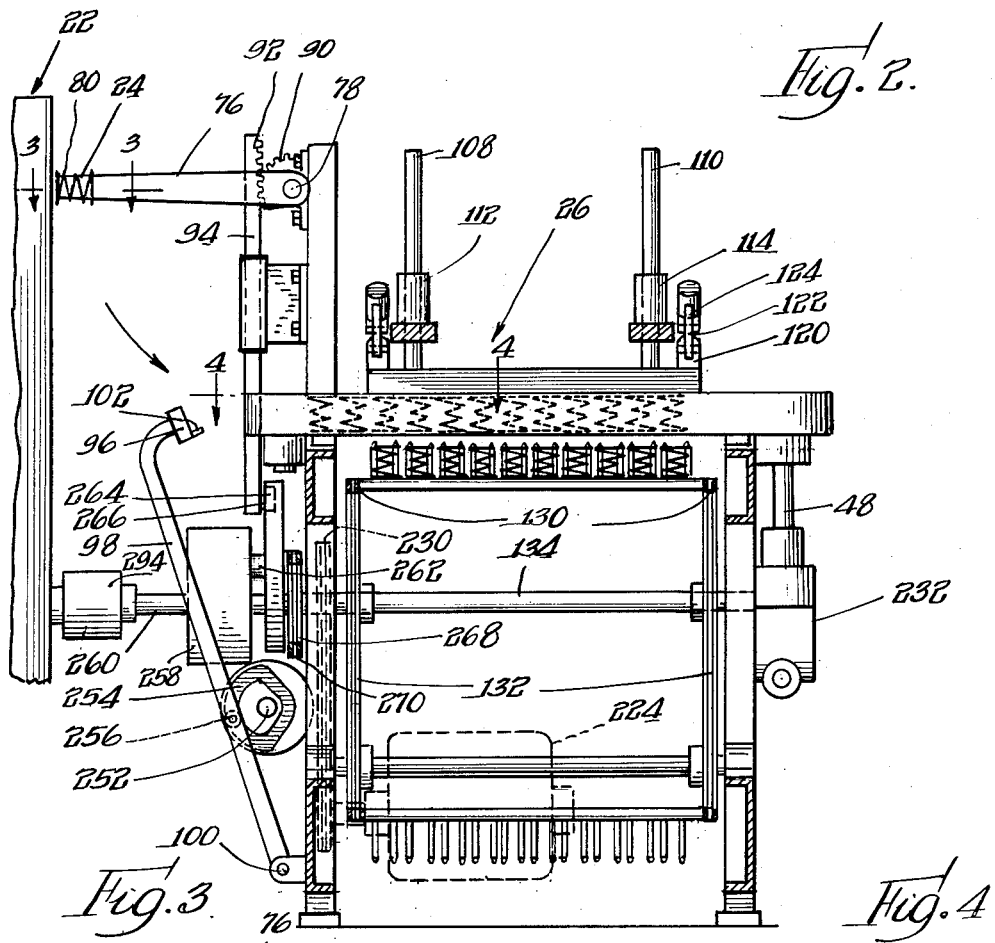
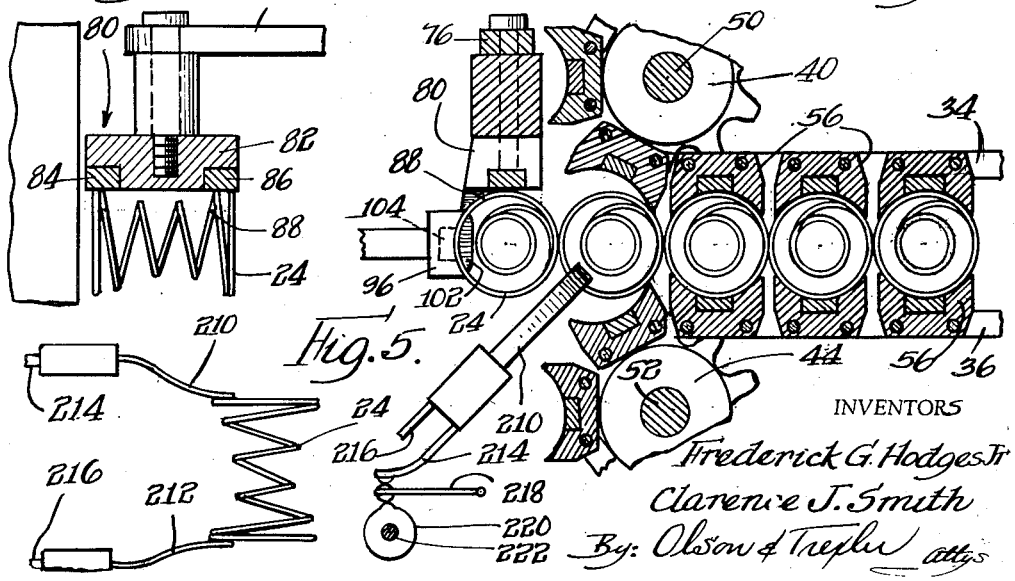
INVENTORS
Frederick G. Hodges Jr.
Clarence J. Smith
By: Olson & Trexler attys Dec. 12, 1961   F. G. HODGES, JR., ET AL   3,012,590
APPARATUS FOR PRODUCING SPRING UNITS
Filed Oct. 30, 1957   5 Sheets-Sheet 3

Inventors
Frederick G. Hodges Jr.
Clarence J. Smith
By: Olson & Turley attys.

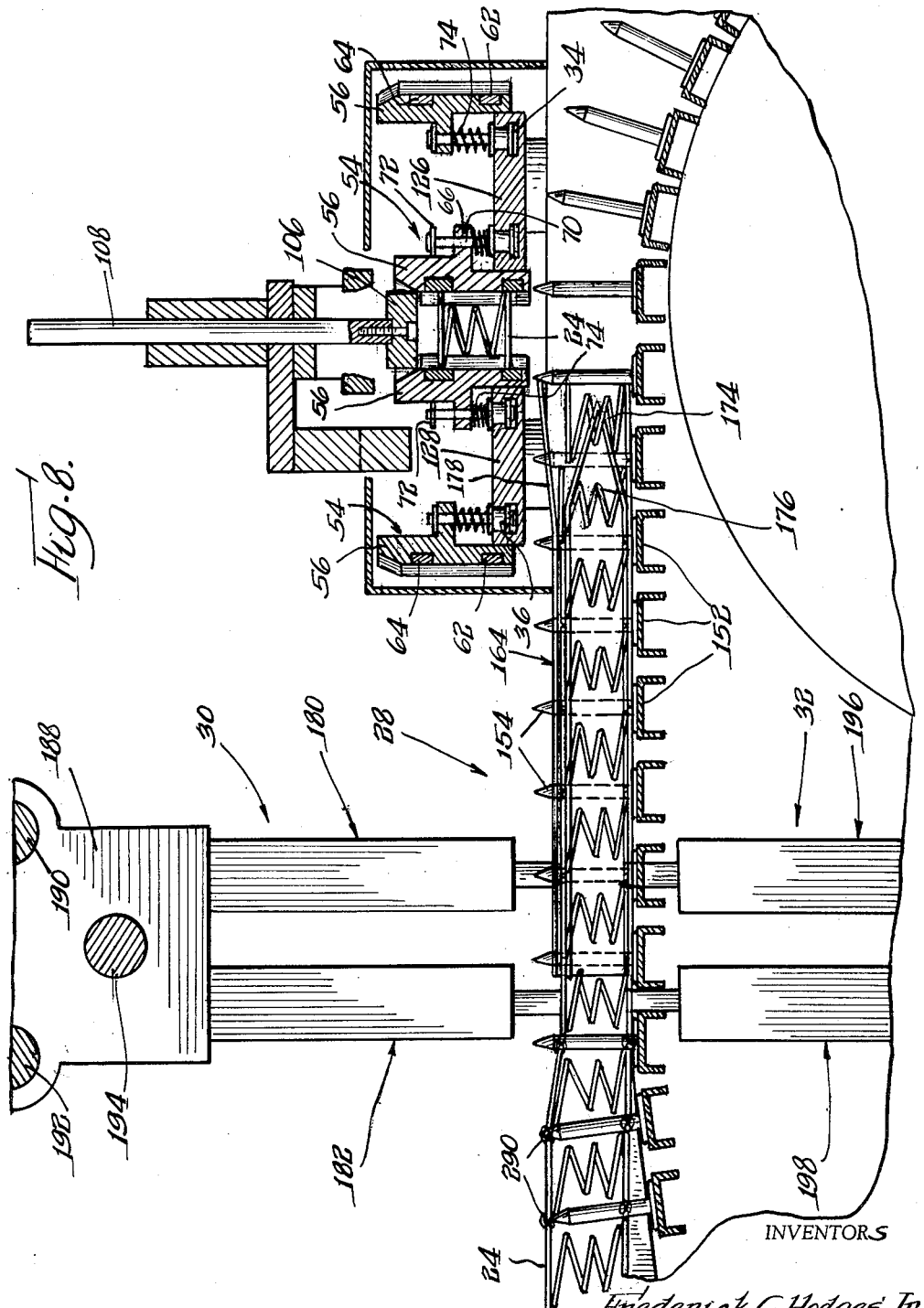

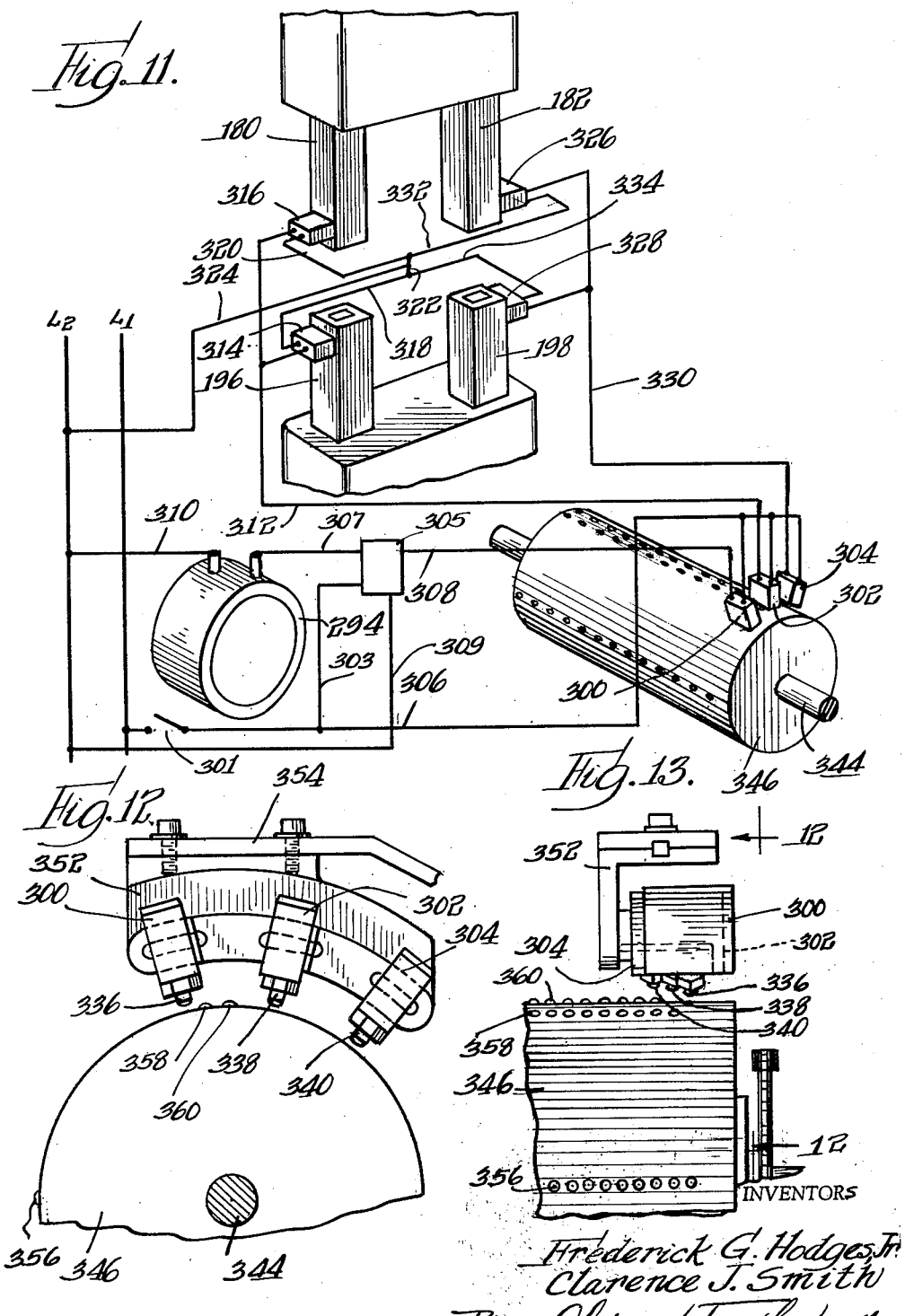

United States Patent Office 3,012,590
Patented Dec. 12, 1961

3,012,590
APPARATUS FOR PRODUCING SPRING UNITS
Frederick G. Hodges, Jr., 730 N. County Road, Palm Beach, Fla., and Clarence J. Smith, 1930 11th St. S., Rockford, Ill.
Filed Oct. 30, 1957, Ser. No. 693,422
18 Claims. (Cl. 140—3)

The present invention relates to a novel apparatus for producing spring cushion units, and more particularly to a novel apparatus for assembling and connecting together coil springs in a predetermined pattern.

An important object of the present invention is to provide a novel apparatus so as to produce coil springs and then assemble such springs in a predetermined pattern and secure adjacent springs to each other in a relatively rapid, efficient and reliable manner.

A more specific object of the present invention is to provide a novel apparatus capable of handling successive coil springs in a reliable manner and automatically positioning such springs securely and accurately in a predetermined pattern and then connecting adjacent springs directly to each other while they are held in the predetermined pattern so as to promote a more efficient and reliable production of spring cushion units and the like.

Another object of the present invention is to provide a novel apparatus of the above described type which is constructed so as to retain adjacent springs in a pattern, in a manner which permits such springs to be secured together with staples or the like.

A still more specific object of the present invention is to provide a novel apparatus of the above described type which is constructed so as to convey a plurality of coil springs retained in a predetermined pattern past stapling or securing stations which maintain such springs under tension so as to promote proper positioning thereof and more reliable stapling or connecting adjacent springs together.

Still another object of the present invention is to provide a novel apparatus of the above described type which is constructed so as to permit heat treating of successive springs for relieving stress therein.

Another specific object of the present invention is to provide a novel apparatus for producing coil springs and then assembling and securing such springs together, which apparatus is constructed so as to permit the production of separate cushion units which may be varied as to size and shape.

Other objects and advantages of the present invention will become apparent from the following description and the accompanying drawings wherein:

FIG. 2 is a sectional view taken generally along line 2—2 of FIG. 1;

FIG. 3 is an enlarged fragmentary sectional view taken along line 3—3 of FIG. 2;

FIG. 4 is an enlarged fragmentary sectional view taken generally along line 4—4 in FIG. 2 and shows the manner in which elements in the apparatus operate to transfer a coil spring to a first conveyor of the apparatus for arranging the springs in a predetermined pattern;

FIG. 5 is an enlarged fragmentary view taken generally along the line 5—5 in FIG. 4;

FIG. 8 is an enlarged fragmentary sectional view taken generally along line 8—8 in FIG. 6;

FIG. 11 is a diagrammatic view showing a simplified control circuit for the apparatus of this invention;

FIG. 12 is a fragmentary sectional view taken along line 12—12 in FIG. 13; and

FIG. 13 is a fragmentary side elevational view of the portion of the apparatus shown in FIG. 12.

Figure 1:
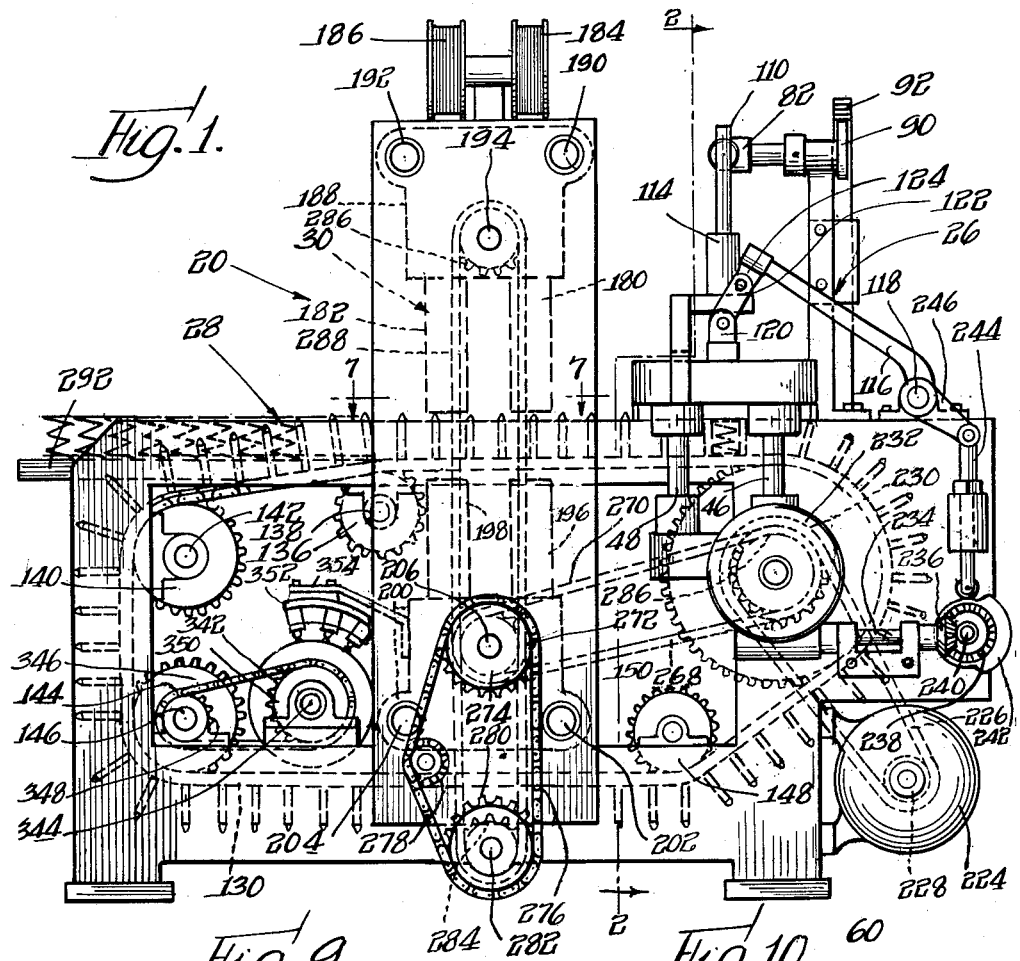
FIG. 1 is a simplified side elevational view showing an apparatus incorporating the features of the present invention.
Figure 6:
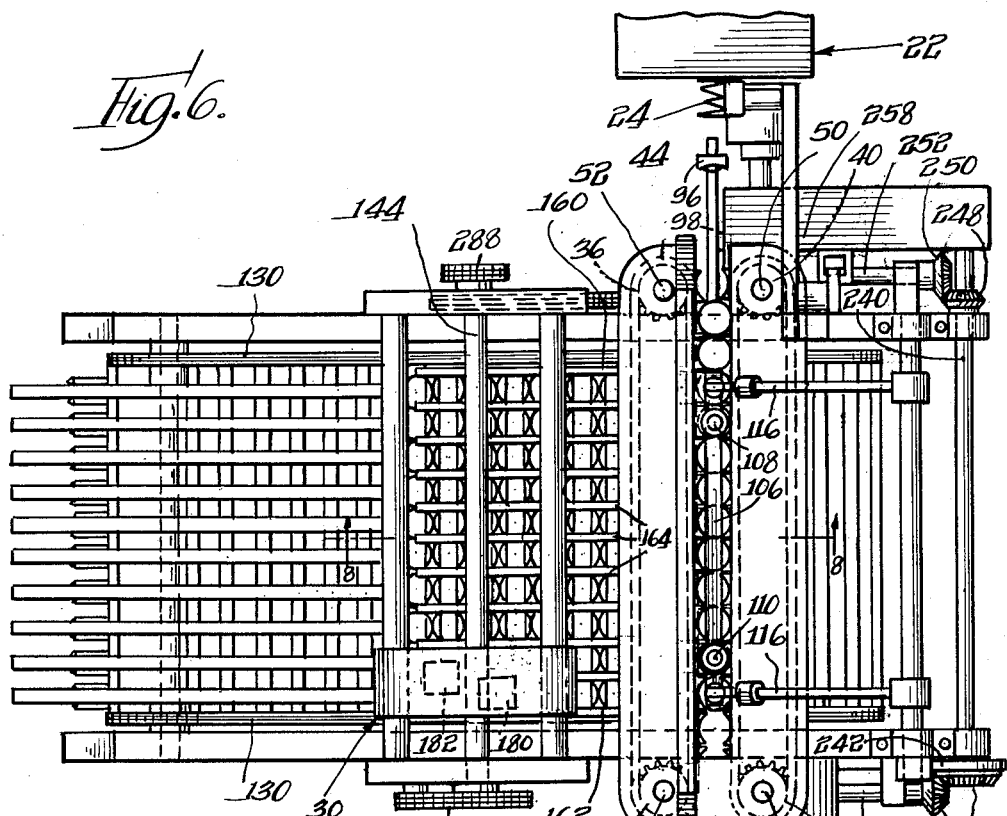
FIG. 6 is a simplified plan view of the apparatus shown in FIG. 1.

Referring now more specifically to the drawings wherein like parts are designated by the same numerals, an apparatus 20 incorporating features of the present invention is shown generally in FIGS. 1, 2 and 6. This apparatus is provided with a spring coiler mechanism 22 which is adapted to form successive portions of a length of wire stock into coil springs 24. The spring coiler 22 may be of known construction and therefore need not be described in detail. Transfer means generally designated by the numeral 26 is provided for transferring successive coil springs 24 from the coiler mechanism 22 to conveying means 28 on which the springs are deposited and arranged in a predetermined pattern. As will become more apparent from the description below, the conveying means 28 intermittently advances the springs between upper and lower stapling means 30 and 32 which are adapted to connect adjacent end coils of adjacent springs with each other by means of staples or hog rings.

Figure 10:
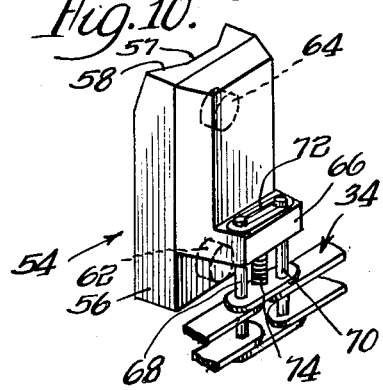
FIG. 10 is a perspective view showing a sub-assembly of a spring conveying and positioning means of the apparatus of this invention.

The transfer and arranging means 26 is provided with a pair of conveyors or endless chains 34 and 36 respectively encircling sprockets 38—40 and 42—44 arranged to rotate in a horizontal plane above the conveyor means 28. The sprockets 38 and 42 are respectively mounted on shafts 46 and 48 which are driven intermittently in timed relationship with each other in the manner described below, and the sprockets 40 and 44 are respectively mounted on vertical shafts 50 and 52. A plurality of spring gripping and locating assemblies 54 is fixed on each of the chains so that as the chains are advanced pairs of the assemblies will be disposed in opposing relationship for receiving springs therebetween. All of the assemblies 54 are identical and, as shown best in FIGS. 4, 8 and 10, each assembly 54 includes a block 56 preferably formed from electrical insulating material. A spring engaging face 57 of the block 56 is provided with diverging portions 58 and 60 for forming a pocket for retaining a spring, and permanent magnets 62 and 64 are mounted in recesses formed in the block so that ends thereof are exposed at the spring engaging surface of the block for retaining a spring within the pocket. A flange 66 extends from the block and is vertically slidably supported by pins 68 and 70. A snap-on elongated sheet metal member 72 interengages with groove means at the upper ends of the pins 68 or 70 for retaining the block on the pins. A spring 74 is compressed between the flange of the block and one of the links of the chains for resiliently maintaining the block in the raised position shown in FIG. 10.

As indicated in FIGS. 1, 2, 3 and 6, the coil springs 24 emerge from the coiler mechanism 22 with their axes disposed substantially horizontally. In order to deliver the coil springs from the coiler mechanism to the spring receiving and locating assemblies 54 and also to turn the springs about 90°, the spring transfer and locating means 26 is provided with an arm 76 secured to a rotatably supported shaft 78 and having a spring gripping head 80 adjacent a free end thereof. The gripping head 80 comprises a block 82 having a spring engageable surface 88 shaped so as partially to conform to a spring. A pair of permanent magnets 84 and 86 is secured to the block, which magnets serve to retain the spring 24 against the spring engageable surface 88 of a block. In order to oscillate the arm 76 between the generally horizontal position shown in FIG. 2 and a depending substantially vertical position indicated in FIG. 4, a gear sector 90 is fixed on the shaft 78 and meshes with a rack 92 at the end of a reciprocable rod 94. The rod 94 is reciprocated in timed relationship with the operation of the rest of the apparatus by drive means described below.

When the arm 76 is in the position shown in FIG. 4, a spring 24 carried thereby is located so that it may be inserted between a pair of the assemblies 54 which are approaching each other as they travel around the sprocket wheels 40 and 44. A spring is transferred from the head means 80 to a pair of the receiving and retaining blocks on the conveyor chains 34 and 36 by means of a pusher block 96 mounted on the upper end of a relatively long oscillating arm 98 which is pivoted at 100. The pusher block 96 may be provided with a lip 102 at its lower end and a permanent magnet 104 for retaining the spring as it is advanced between the conveyor chains.

The conveyor chains 34 and 36 are intermittently advanced after receiving each successive spring so as to form a row of springs over and traversing the conveying means 28. When this row of springs is completed, these springs are shifted downwardly and are deposited on the conveying means 28. This is accomplished by means of an elongated pusher bar 106 which is horizontally disposed and which is mounted for substantially vertical movement as shown in FIGS. 1, 2, 6 and 8. More specifically, the pusher bar 106 is secured to lower ends of upstanding rods 108 and 110, which rods are mounted for vertical reciprocal movement by suitable bearing means 112 and 114. In order to actuate the pusher bar 106, a pair of identical arms 116 is secured to a shaft 118 and also secured to opposite ends of the pusher bar 106 through pivotally connected links 120, 122 and 124.

Means, described below, is provided for oscillating that shaft 118 in timed relationship with other elements of the apparatus. The operation is such that the pusher bar 106 is intermittently forced downwardly between adjacent runs of the cover chains 34 and 36 so as to push a row of springs downwardly and onto the conveying means 28. As mentioned above, the blocks 56 of each of the spring retaining and locating assemblies 54 are resiliently supported above the length of their associated chains. When the pusher bar 106 is lowered, the blocks 56 associated with the springs being pushed downwardly are also pushed downwardly until their flanges 66 engage the chain. As a result, the blocks are effective for guiding the springs and maintaining positive control over the springs at least until the springs have been substantially engaged or located by means of the conveyor means 28 described below. In order to prevent the chains 34 and 36 and the assemblies 54 thereon from sagging and interfering with the conveying means 28, slotted guide plates 126 and 128 are mounted for receiving and guiding the chains.

The conveying means 28 is provided with a pair of endless chains 130 which extend around a pair of large drive wheels or sprockets 132 respectively secured adjacent to opposite ends of a rotatably supported drive shaft 134. The chains 130 extend substantially horizontally forwardly from the sprockets 132 and over idler sprockets 136 mounted on a shaft 138. Then the chains extend forwardly and downwardly for a purpose described hereinbelow and around idler sprockets 140 secured to a shaft 142. The chains then extend down and around idler sprockets 144 on a shaft 146, from which idler sprockets the chains extend rearwardly and around idler sprockets 148 and back to the drive sprockets. The sprockets 148 are mounted on a shaft 150.

Extending transversely between and secured to the chains 130 are channel members 152. The channel members present their flat bottom surfaces facing outwardly and, as shown in the drawings, the channel members are disposed in adjacent spaced apart relationship so as to provide the conveying means 28 with a broad endless support for a plurality of the springs.

Figure 9:
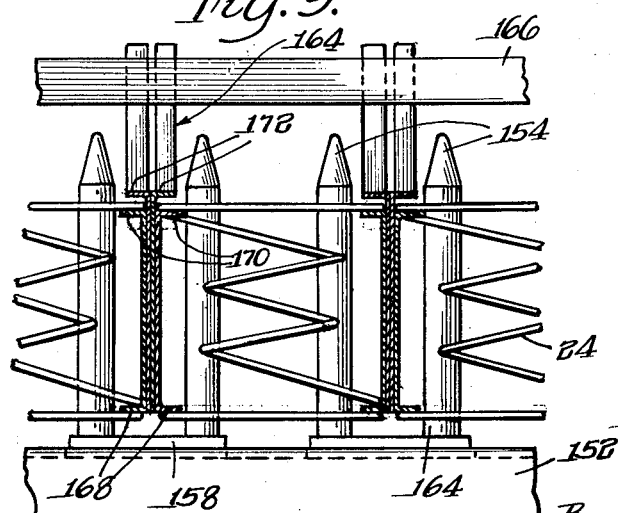
FIG. 9 is an enlarged fragmentary sectional view taken generally along line 9—9 in FIG. 8.
Figure 7:
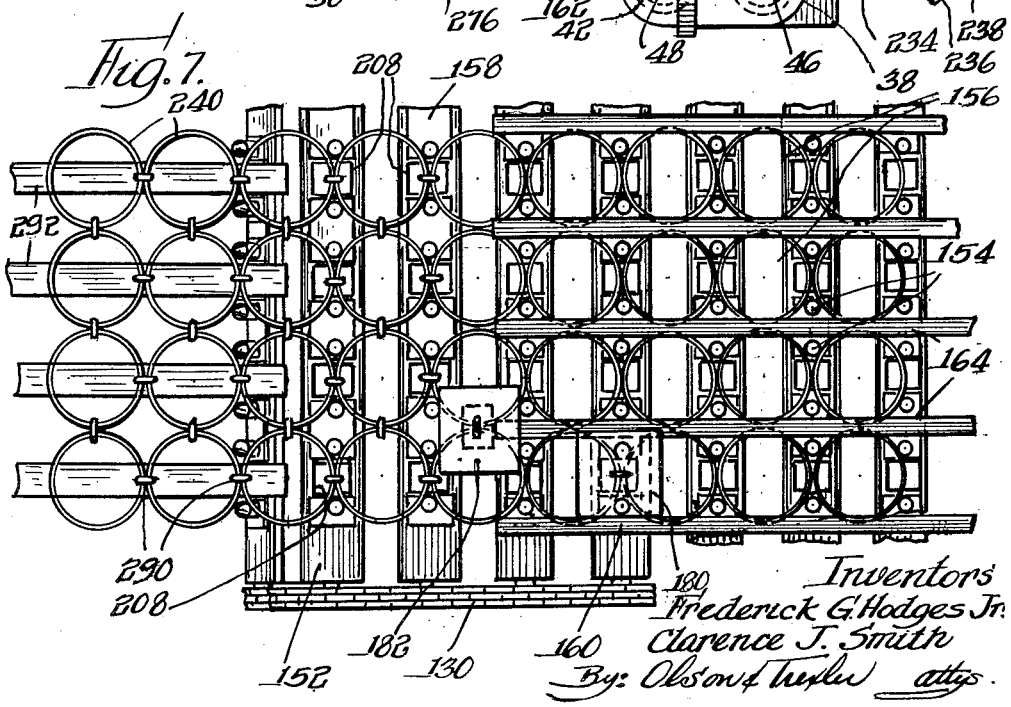
FIG. 7 is an enlarged fragmentary plan view taken generally along line 7—7 in FIG. 1.

As shown best in FIGS. 7, 8 and 9, upstanding pins 154 having pointed upper ends are mounted on the channel members 152 so as to provide a plurality of pockets 156 for receiving and retaining springs in a predetermined pattern. Preferably the pins 154 are mounted in pairs on plate members 158 which in turn are welded or otherwise secured to the channel members. It will be noted that the pairs of pins are arranged so that each spring receiving pocket is defined by four of the pins and each pin is engageable with a pair of immediately adjacent springs. The arrangement is such that the spring receiving and retaining pockets 156 are located in rows extending transversely of and longitudinally of the endless support, and this endless support is intermittently operated by the means described below so as successively to locate each transversely extending row of the pockets 156 beneath and in alignment with springs which are retained and located by the blocks 56 of the transfer and locating means 26.

As mentioned hereinabove, the blocks 56 will be pushed downwardly when the pusher rod 106 is actuated, and this causes the lower ends of the blocks 56 to be located so as to guide the springs until the lower ends of the springs have entered their respective pockets 156 between the upstanding pins. The pointed upper ends of the pins are provided so as to insure entry of the springs into the pockets 156 and reduce any possibility of a spring pin entering within a coil of a spring rather than extending along the outside of a spring. It will further be noted that the arrangement of the pins 154 is such that end coils of adjacent springs are retained in a substantially abutting relationship, and the pins are disposed laterally of areas of substantial tangency of the end coils so as to enable coils to be stapled or hog ringed together at such areas.

The conveying and locating means 28 is provided with means in addition to the pins 154 for obtaining an even more positive control over the springs and for positively determining the location of the end coils of the springs in a direction extending axially of the springs so as to facilitate interconnection of such end coils. It is also important to note that this means, which will presently be described in detail, is constructed so as to place the springs under tension since it has been found that this enables the relationship of the springs with respect to each other to be more positively and reliably controlled with the resulting insurance of proper connection of the springs to each other. As shown best in FIGS. 6, 7, 8 and 9, this means comprises a pair of opposite side longitudinally extending guide members 160 and 162 and a plurality of intermediate guide members 164. These guide members extend along and between the longitudinally extending rows of spring receiving pockets 156. The guide members 160, 162 and 164 are suitably secured to and supported by transverse frame members 166 located above the endless support means. Each of the guide members 164 is provided with oppositely projecting lower marginal flanges 168 respectively adapted to overlie lower coils of springs located in the pockets at opposite sides of the guide member. Similar flanges 170 are provided adjacent to but spaced below upper margins of each guide member for engaging beneath upper end coils of the springs, and additional somewhat similar flanges 172 are provided above the flanges 170 for overlying the upper end coils of the springs. As shown in FIG. 8, the flanges 168 and 170 are provided with converging portions 174 and 176 adjacent the location or station at which the springs are loaded onto the conveying means 28, and the flanges 172 are provided with upwardly inclined portions 178 at the same location. This arrangement insures proper engagement of the flanges with end coils of the springs regardless of any slight variation in the length of the springs. It is important to note that the distance between the upwardly and downwardly facing spring engageable surfaces of the flanges 170 and 168 respectively is greater than the normal axial length of the springs so as to cause tensioning of the springs for the purpose mentioned above. It is understood, of course, the side guide members 160 and 162 are each provided with a single set of inwardly projecting flanges corresponding to the flanges 168, 170 and 172.

The stapling means 30 for interconnecting upper ends of the springs is provided with a first stapling head 180 for interconnecting the springs longitudinally of the spring pattern or conveying means 28 and a second stapling head 182 for interconnecting the springs transversely of the spring pattern or conveying means 28. These stapling heads may be of known construction and therefore need not be described in detail, and it suffices to state that the stapling heads are of a type capable of feeding successive increments of length of wire from reels 184 and 186 shown in FIG. 1 and then severing such length of wire and forming them into hog rings around substantially abutting portions of end coils of adjacent springs. The stapling heads 180 and 182 are carried by a housing 188 which is slidably supported by a pair of guide bars 190 and 192 and through which extends a rotatable drive shaft 194. The housing 188 contains mechanism, also of known construction, adapted to be driven by the shaft 194 so as intermittently to traverse the stapling heads across the spring pattern or conveying means 28 and to actuate the stapling heads during each pause in the traversing movement thereof for securing pairs of adjacent springs together.

The lower stapling means is also provided with stapling heads 196 and 198 respectively adapted to connect lower ends of the coil springs together longitudinally and transversely of the spring pattern. These stapling heads are also supported by a housing 200 containing mechanism identical to the housing 188 and slidably supported on guide rods 202 and 204 and also axially shiftably receiving the drive shaft 206. The stapling heads 196 and 198 are actuated in unison with the stapling heads 180 and 182. It will be noted that the stapling head 198 is adapted to extend between the channel members 152 of the conveyor for connecting lower end coils of the springs and that the stapling head 196 is located so as to be in alignment with a channel member 152 during the stapling operation. However, each of the channel members 152 is provided with a transversely extending series of apertures 208 through which the stapling head 196 may project for connecting the springs.

The apparatus is provided with means for heat treating each successive spring for relieving stresses built up in the wire during the formation of the spring. As shown in FIGS. 4 and 5, this means comprises a pair of electrical contact fingers 210 and 212 mounted adjacent the conveyors 34 and 36 and connected by wires 214 and 216 to a suitable source of electric energy. The contact fingers are disposed for aggressive engagement with opposite end coils of each successive spring, so as to insure good electrical contact therewith. Switch means 218 is connected in the wire 214 for making and breaking the circuit, which switch means is intermittently closed by any suitable device such as a cam 220 mounted on shaft 222 and driven in timed relationship with the other elements of the apparatus. For example, the cam 220 is driven so that the switch means is closed for about one-fifth of a second during each pause in the intermittent movement of the conveyors 34 and 36 so that the successive coil springs are heated by the electrical energy delivered thereto sufficiently to relieve the stresses therein.

It will be appreciated that various suitable drive means may be provided for actuating the various elements of the apparatus described above in timed relationship with each other. For example, such drive means may include an electric motor 224 for driving the shaft 134 by means of a belt or chain 226 which encircles a wheel 228 on the shaft of the motor and a wheel 230 on the shaft 134. The shaft 134 extends for driving a transmission 232. The above described drive shafts 46 and 48 are connected to and are driven by the transmission 232, and another drive shaft 234 extends from and is driven by the transmission 232. The drive shaft 234, see FIG. 1, carries a bevel gear 236 which meshes with and drives a bevel gear 238 fixed on a rotatably supported shaft 240. The shaft 240 carries a cam 242 which actuates a reciprocably mounted rod 244. This rod is pivotally connected to a lever 246 which in turn is connected to the shaft 118 for actuating the shaft and thus the pusher bar 106. The shaft 240 carries another bevel gear 248 thereon adjacent an end thereof opposite from the cam 242, which bevel gear meshes with gear 250 on a shaft 252. The shaft 252 carries a slotted face-type cam 254 which receives the cam follower 256 on the pivoted arm 98 for actuating this arm. The shaft 240 is also connected with and drives a transmission 258 having output shaft 260 extending for driving the coiler mechanism 22. Another output shaft 262 of the transmission 258 carries and drives a slotted face-type cam 264 which receives a cam follower 266 connected with the reciprocable rod 94 for actuating this rod. If desired, the transmission 258 may be constructed so as to drive the cam shaft 222 of the electrical switch actuating means.

As indicated in FIG. 1, the lower stapling head drive shaft 206 is driven from a sprocket wheel 268 on the shaft 134 by a chain 270 which encircles a sprocket wheel 272 on the shaft 206. Another sprocket wheel 274 is fixed on the shaft 206 for driving a chain 276 which extends around an idler sprocket 278 and a sprocket wheel 280 on a shaft 282. The shaft 194 which actuates the upper stapling heads is driven from the shaft 282 by sprocket wheels 284 and 286 secured to these shafts and a chain 288 encircling the sprocket wheels.

A brief résumé of the manner in which the apparatus described above operates is as follows. When the motor is energized and the various elements are operating in timed relationship, springs 24 are successively formed by the mechanism 22 and then arranged in a row above the conveying means by the transfer and locating means 26. The cam 242 for actuating the pusher bar 106 is constructed and driven so as to actuate the pusher bar only after a complete row of springs has been received by the conveyors 34 and 36. After the pressure bar 106 deposits a row of springs on the conveying means 28, the endless support structure thereof is advanced one step. As this action continues, the springs are advanced between the guide members 160, 162 and 164 so that they are placed under tension and so that they are successively advanced to first and second stapling stations between the stapling heads 180—196 and 182—198. During the pause between each intermittent movement of the endless support structure and the spring pattern thereon, the stapling heads completely traverse the spring pattern so as to connect adjacent springs to each other. It is to be noted that the springs are first connected longitudinally of the spring pattern by the stapling heads 180 and 196. The staples or hog rings 290 applied by the stapling heads 180 and 196 help to retain the springs in a predetermined relationship as they pass partially beyond the ends of the guide members 160, 162 and 164 so as to expose abutting portions of transversely adjacent springs for receiving staples or hog rings from the stapling heads 192 and 198.

As the springs are advanced from the stapling heads and to the downwardly inclined portion of the endless support structure or conveyor means, they are removed from the pockets provided by the upstanding pins. This is accomplished by means of substantially horizontal stripper bars 292 which are disposed substantially horizontally and slightly beneath the highest portion of the endless support or conveyor means and which also extend between the pins providing the spring receiving pockets.

It will be appreciated that it is frequently desirable to interrupt the spring pattern so as to provide separate spring cushion units or so as to modify the shape of a spring unit. This result may be accomplished by interrupting the formation of the coil springs in the coiler so as to eliminate either an entire transverse row springs or a portion of transverse row springs which would normally be assembled by the transfer means 26 during a pause in the intermittent movement of the conveyor means 28. Such interruption of the formation of the springs may be accomplished by providing a clutch 294 between the drive shaft 260 and the coiling mechanism 22, which clutch may be actuated manually or automatically by any suitable means for interrupting the formation of the springs in the desired manner.

Means constructed in accordance with a feature of the present invention for controlling the apparatus to provide cushion units of the desired shape is shown in FIGS. 1 and 11–13. This means includes a switch 300 for controlling the magnetic clutch 294 and similar switches 302 and 304 respectively for controlling the stapling heads 180—196 and 182—198. One terminal of each of these switches is connected to power line L1 by a wire 306 having a master switch 301 connected therein. A branch wire 303 is connected to one terminal of the magnetic clutch through a circuit including a relay 305 and wire 307, which circuit is normally closed when the switch 301 is closed. Wire 310 extending from the magnetic clutch to line L2 completes the circuit. A terminal of a control circuit of the relay is connected by wire 308 to switch 300. The relay control circuit is completed by wire 309 which extends to the line L2.

The switch 302 has a terminal connected by a wire 312 and suitable branch wires to solenoid operated devices 314 and 316 which control operation of the stapling heads 180 and 196, which solenoid devices have their other terminals connected by wires 318, 320, 322 and 324 to line L2. Similar solenoid devices 326 and 328 associated with the stapling heads 180 and 182 are connected by wire 330 to the switch 304 and by wires 332 and 334 to the wire 322 and thus to the line L2. The solenoid devices are constructed so that when the solenoids are energized the associated stapling heads will not provide a staple for application to the spring unit. The switches 300, 302, and 304 are constructed so that they are normally open and the system is such that when switch 300, for example, is closed, the relay control circuit is energized to open the magnetic clutch circuit and thereby stop the coiling mechanism. When the switches 302 and 304 are closed their respective associated stapling heads are prevented from applying a staple or hog ring to the springs.

The switches 300, 302 and 304 are respectively provided with yieldably biased push-buttons or plungers 336, 338 and 340 which may be pushed inwardly or depressed for closing the switches. In order to actuate or depress the plungers of the switches, a control drum 342 is provided, which drum is fixed on a rotatable shaft 344. The shaft 344 is driven from the shaft 146 and thus in timed relationship with the remainder of the apparatus by a drive chain 346 which encircles sprocket wheels 348 and 350 mounted on the shafts 146 and 344 respectively. The switches are secured to a suitable support member 352 which in turn is mounted by a bracket 354 to the housing 200 so that the switches are intermittently traversed along the length of the control drum in timed relationship with the intermittent transverse movement of the stapling head. As indicated in FIGS. 11, 12 and 13, a plurality of protuberances 356 is provided on the control drum for engaging and depressing the plunger 336 and similar protuberances 358 and 360 are respectively provided for actuating the plungers 338 and 340. In general the protuberances are placed so as to actuate the switch plungers each time it is desired to omit a spring or staple from the spring unit regardless of the position of the switches axially of the control drum and regardless of the position to which the drum may be rotated. Thus it will be noted that the protuberances are located at predetermined positions so that the ultimate size and shape of the spring assembly is predetermined. For example, an axially extending row of the protuberances 356 is provided as indicated in FIG. 13 so that the coiler mechanism will be inoperative for supplying springs during one complete traversing movement of the stapling heads and one indexing movement of the conveying means with the result that the spring cushion unit will be terminated. In addition the protuberances 358 and 360 should be provided at appropriate locations so that the stapling heads will not be actuated when the end of the spring cushion unit is passing between the stapling heads. It will be appreciated that by providing protuberances 356, 358 and 360 at other predetermined locations, portions of any given row of the springs in a cushion unit may be omitted so as to provide the unit with any desired peripheral configuration.

While a preferred embodiment of the present invention has been shown and described herein, it is obvious that many structural details may be changed without departing from the spirit and scope of the appended claims.

The invention is claimed as follows:

1. An apparatus for producing a spring unit comprising coiler means for successively forming a plurality of coil springs, means adjacent said coiler means for receiving and conveying a plurality of coil springs in a predetermined pattern, means disposed adjacent said coiler means and said conveying means for picking up each successive spring substantially as it is formed and for individually transferring springs from said coiler means to a position and into a predetermined pattern adjacent said conveying means for simultaneously shifting a group of the springs from said position and onto said conveying means, means disposed adjacent said conveying means for connecting springs on the conveying means together, and means for actuating all of said aforementioned means in timed relationship.

2. An apparatus for producing spring units comprising coiler means for forming a plurality of wire coil springs, means adjacent said coiler means for receiving and conveying a plurality of coil springs in a predetermined pattern, means disposed for transferring springs from said coiler means to said conveying means, means disposed adjacent said conveying means for connecting springs on the conveying means together, means for actuating all of said aforementioned means in timed relationship, and means operable for discontinuing delivery of springs from said coiler means in a predetermined manner so as to vary the shape of the spring pattern on the conveying means.

3. An apparatus, as defined in claim 2, wherein said last mentioned means includes clutch means between said coiler means and said actuating means for enabling an interruption in the formation of coil springs by the coiler means.

4. An apparatus for producing spring units comprising coiler means for forming a plurality of wire coil springs, means adjacent said coiler means for receiving and conveying a plurality of coil springs in a predetermined pattern, guide elements disposed along said conveying means for controlling the axial length of springs on the conveying means and for placing such springs under tension for facilitating subsequent interconnection of the springs, means disposed adjacent said conveying means for connecting the springs together, and means for actuating all of said aforementioned means in timed relationship, said means for transferring the springs including second conveying means disposed adjacent to and extending transversely of said first mentioned conveying means substantially from one longitudinally extending margin of the first mentioned conveying means to the other longitudinally extending margin of the first mentioned conveying means for receiving successive springs and assembling and retaining the springs in a row extending transversely of the first conveying means, reversibly shiftable means for transferring successive springs from the coiler means to the second conveying means, and pusher means for shifting a row of springs from the second conveying means to the first conveying means.

5. An apparatus as defined in claim 4, wherein said connecting means comprises a first stapling head disposed for securing adjacent springs together lengthwise of the conveying means, and a second stapling head adjacent to and offset from ends of said guide elements for connecting adjacent springs transversely of the conveying means.

6. An apparatus, as defined in claim 5, wherein said transfer means includes second conveying means disposed adjacent to and transversely of said first mentioned conveying means for receiving successive springs and assembling and retaining the springs in a row extending transversely of the first conveying means, reversibly shiftable means for transferring successive springs from the coiler means to the second conveying means, and pusher means for shifting a row of springs from the second conveying means to the first conveying means.

7. An apparatus, as defined in claim 4, wherein said reversibly shiftable means is magnetic for retaining a wire coil spring while it is being transferred from the coiler means to the second conveying means.

8. An apparatus, as defined in claim 4, wherein said second conveying means includes series of magnetic means for receiving and retaining wire coil springs.

9. An apparatus for producing spring units comprising coiler means for forming a plurality of coil springs, means adjacent said coiler means for receiving and conveying a plurality of coil springs in a predetermined pattern, magnetic means disposed for transferring springs from said coiler means to said conveying means, means disposed adjacent said conveying means for connecting springs thereon together, and means for actuating all of said aforementioned means in timed relationship.

10. An apparatus for producing spring units comprising coiler means for successively forming wire coil springs with their axes disposed generally horizontally, means adjacent said coiler means for receiving and conveying a plurality of coil springs in a predetermined pattern with axes of the springs disposed generally vertically, means disposed adjacent said conveying means for transferring springs from the coiler means to the conveying means and for turning the springs during such transfer thereof to locate their axes generally vertically, means disposed adjacent said conveying means for connecting the springs thereon together, and means for actuating said aforementioned means in timed relationship.

11. In an apparatus for producing spring units, means for conveying a plurality of springs in a predetermined pattern having rows of springs extending longitudinally of and transversely of the conveying means, means adjacent said conveying means for successively transferring springs from a source of supply to said conveying means and including second conveying means traversing said first mentioned conveying means for successively receiving the springs adjacent one longitudinal edge of said first mentioned conveying means and for advancing the successive springs in side by side relationship and in a direction extending toward an opposite longitudinally extending edge of said first mentioned conveying means for arranging a row of springs transversely of the first mentioned means, and means for simultaneously shifting the springs from said second conveying means to the first conveying means, and means for actuating the aforementioned means in timed relationship, said second conveying means including a series of magnetic means for retaining springs with their axes extending generally perpendicularly with respect to said first mentioned conveying means, and said shifting means including pusher bar means movable generally axially of said springs and engageable with ends of the springs retained by the magnetic means for pushing the springs from the magnetic means to said first mentioned conveying means.

12. An apparatus, as defined in claim 11, wherein said second conveying means includes a pair of opposing endless means, said magnetic means being arranged in opposing pairs respectively mounted on the pair of opposing endless means, and said pusher bar means being operable between the opposing pairs of magnetic means.

13. In apparatus for producing spring units, means for conveying a plurality of springs in a predetermined pattern having rows of springs extending longitudinally of and transversely of the conveying means, means adjacent said conveying means for transferring springs from a source of supply to said conveying means, said last mentioned means including second conveying means disposed adjacent to and extending transversely of said first mentioned conveying means, a plurality of spring retaining members on said second conveying means for receiving and arranging a row of springs transversely of the first mentioned conveying means, means mounting said spring retaining members on said second conveying means for limited movement relative to and transversely of said second conveying means and toward and away from said first mentioned conveying means, and pusher means for shifting springs from said retaining members to said first mentioned conveying means, said retaining members shifting toward said first mentioned conveying means during transfer of the springs for guiding the springs until they are at least partially received by the first mentioned conveying means, and means for actuating said aforementioned means in timed relationship.

14. An apparatus, as defined in claim 13, wherein said first mentioned conveying means includes an endless support structure, and a plurality of outwardly projecting pins secured to said support structure and defining rows of spring receiving pockets extending longitudinally of and transversely of the support structure.

15. In an apparatus for producing spring units, conveying means for receiving and retaining a plurality of coil springs in a predetermined pattern having rows of springs extending longitudinally of and transversely of the conveying means, said conveying means including a movably supported endless support structure, a plurality of upstanding pin elements secured to the support structure and defining rows of pockets extending longitudinally of and transversely of the support structure for receiving and retaining springs so that springs which are adjacent each other transversely and longitudinally of the support structure have end coils in substantially abutting relationship, and guide means extending longitudinally of said support structure and between longitudinally extending rows of said pin elements and engageable with opposite end coils of the springs for axially stressing the springs and positively controlling the axial length of the springs and thereby facilitating interconnection of the springs.

16. An apparatus, as defined in claim 15, wherein said guide means includes oppositely facing elements engageable with and spaced apart a distance greater than a normal spacing of opposite end coils of the springs for placing the springs under tension whereby to facilitate control of and interconnection of the springs.

17. An apparatus, as defined in claim 15, wherein said endless support structure has a substantially horizontal portion for conveying the springs past means for connecting the springs together, and a downwardly inclined portion downstream from the connecting means, said apparatus including elongated elements extending substantially to said downwardly inclined portion and between said pin elements for removing springs which have been connected together from said endless support structure.

18. An apparatus for producing spring units comprising means for receiving and conveying a plurality of coil springs in a predetermined pattern having longitudinally and transversely extending rows of springs, means for supplying coil springs to said receiving and conveying means, means disposed adjacent said receiving and conveying means for connecting the springs thereon together, means for actuating all of the aforementioned means intermittently and in timed relationship, and control means for rendering said spring supplying means and said spring connecting means inoperative in a predetermined manner for omitting springs from certain of said rows, said last mentioned means including a rotatable member intermittently operable in timed relationship with said receiving and conveying means, switch means movable axially along and in timed relationship with said rotatable member, a plurality of means in a predetermined pattern on said rotatable member for actuating said switch means.

References Cited in the file of this patent

UNITED STATES PATENTS

| | | |
|---|---|---|
| 1,887,215 | Owen | Nov. 8, 1932 |
| 1,948,754 | Gail | Feb. 27, 1934 |
| 2,296,878 | Saval | Sept. 29, 1942 |
| 2,382,226 | Hodges | Aug. 14, 1945 |
| 2,388,106 | Woller | Oct. 30, 1945 |
| 2,603,246 | Dockery | July 15, 1952 |
| 2,663,038 | Gail | Dec. 22, 1953 |
| 2,716,308 | Hodges | Aug. 30, 1955 |
| 2,854,034 | Waful | Sept. 30, 1958 |